United States Patent

Lopez

[15] 3,653,457
[45] Apr. 4, 1972

[54] ANTI-THEFT DEVICE FOR AUTOMOTIVE VEHICLES AND OTHER APPARATUS

[72] Inventor: Walfrido R. Lopez, 24-46 44th Street, Astoria, N.Y. 11103

[22] Filed: Jan. 8, 1970

[21] Appl. No.: 1,371

[52] U.S. Cl..........................180/114, 137/552.5
[51] Int. Cl..........................................B60r 25/04
[58] Field of Search..............180/114; 123/198 B, 198 DB; 137/552.5; 70/287, 298; 200/45

[56] References Cited

UNITED STATES PATENTS

| | | | |
|---|---|---|---|
| 1,273,283 | 7/1918 | Smith | 137/552.5 |
| 2,904,070 | 9/1959 | Lynott | 137/552.5 |
| 1,390,859 | 9/1921 | Andrejewski | 137/552.5 |
| 1,412,134 | 4/1922 | Probstel | 137/552.5 X |
| 1,476,293 | 12/1923 | Gantz | 137/552.5 X |
| 2,162,995 | 6/1939 | Bruington | 70/298 |
| 3,057,375 | 10/1962 | Etter | 137/552.5 |
| 3,543,040 | 11/1970 | Nemeth | 180/114 X |

*Primary Examiner*—Kenneth H. Betts
*Attorney*—Harry Cohen

[57] ABSTRACT

New and improved anti-theft device for use in automobiles and the like is provided and comprises fuel flow control means which, when activated, are effective to prevent fuel flow to the automobile engine and, when deactivated, will not interfere with such fuel flow. Means are included to automatically activate said fuel flow control means upon the turning off of the automobile ignition. Additional fuel flow control means which include an auxiliary fuel tank of relatively limited capacity are included and are operable, when activated, to enable limited movement of the automobile as for movement in a parking lot or the like.

8 Claims, 8 Drawing Figures

Patented April 4, 1972

INVENTOR.
WALFRIDO R. LOPEZ
BY

INVENTOR.
WALFRIDO R. LOPEZ
BY
His Attorney

Patented April 4, 1972

INVENTOR.
WALFRIDO R. LOPEZ
BY
His Attorney

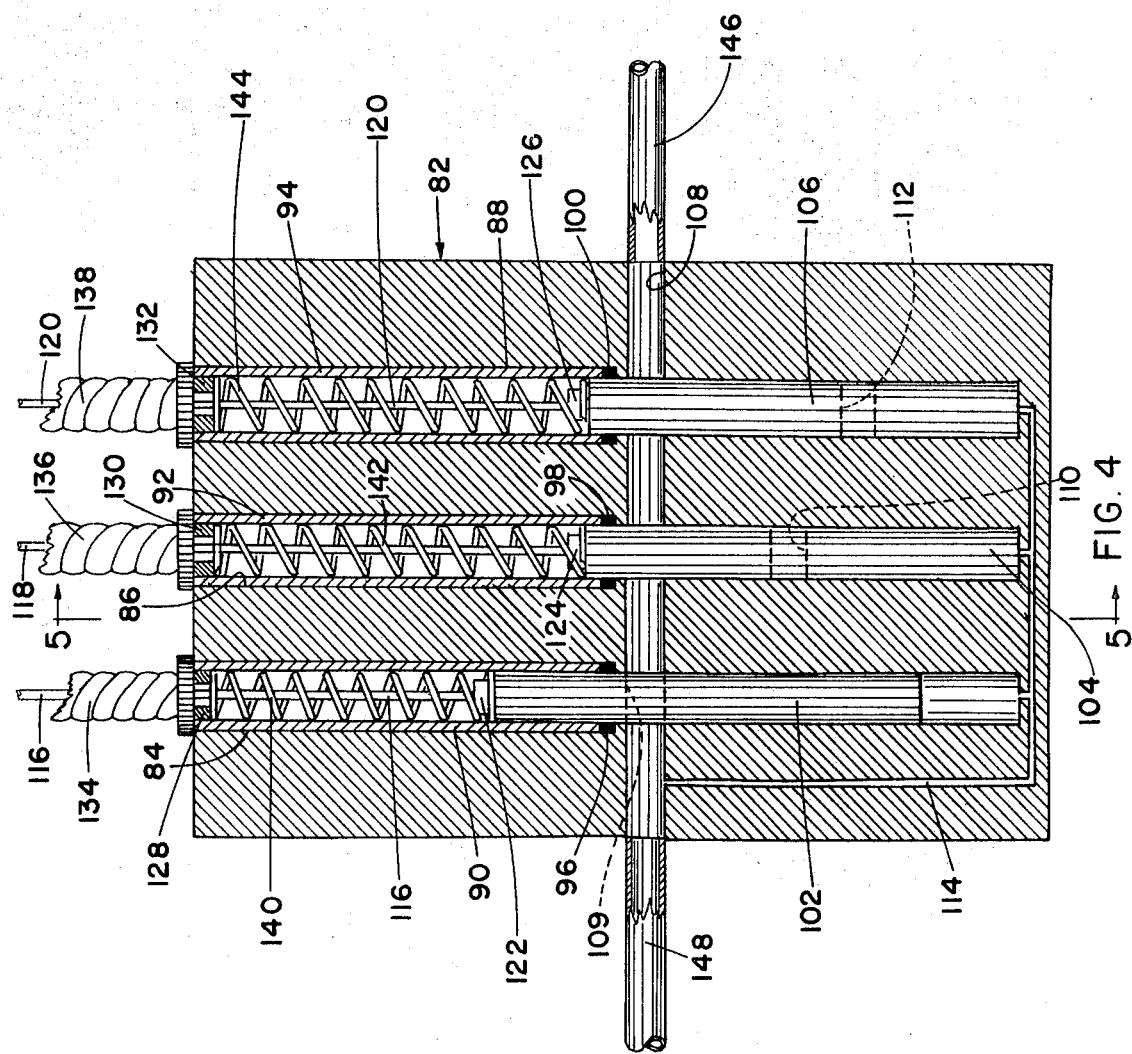

INVENTOR.
WALFRIDO R. LOPEZ

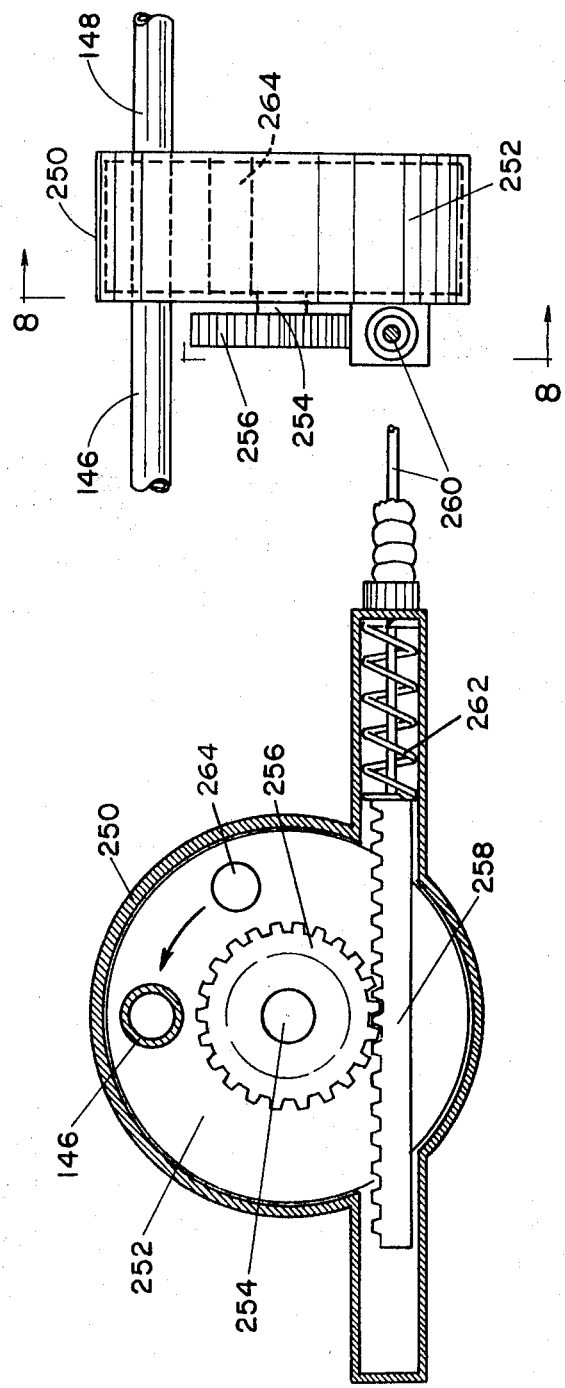

3,653,457

ANTI-THEFT DEVICE FOR AUTOMOTIVE VEHICLES AND OTHER APPARATUS

BACKGROUND OF THE INVENTION

1. Field of the Invention

This invention relates to a new and improved anti-theft device for use with automobiles and the like.

2. Description of the Prior Art

Although a wide variety of anti-theft devices are known for use with automobiles and the like to counteract the current alarming rise in auto thefts, it may be understood that the same will, in general, be found to be unduly complex and/or expensive to fabricate and install, and quite difficult to operate satisfactorily, or to be generally unreliable in preventing auto theft. This is to say that in those instances wherein such prior art devices are of relatively simple and inexpensive form, the same generally prove to be too easy to bypass or deactivate to present a substantial impediment to the stealing of the car. Too, it is believed well known that many of the anti-theft devices of the prior art simply sound an alarm or the like which does not, of course, function to absolutely prevent the theft of the car.

OBJECTS OF THE INVENTION

It is, accordingly, an object of this invention to provide new and improved anti-theft apparatus for use with automobiles and the like.

Another object of this invention is the provision of apparatus as above which are of relatively simple and inexpensive construction and are relatively easy to operate properly.

Another object of this invention is the provision of apparatus as above which are absolutely reliable in preventing theft of the automobile, and which cannot readily be bypassed or deactivated.

A further object of this invention is the provision of apparatus as above which require the use of only readily available components of proven dependability in the fabrication thereof to thus insure long periods of satisfactory, substantially maintenance-free apparatus operation.

SUMMARY OF THE INVENTION

As currently preferred, the apparatus of the invention comprise multi-element valve means which include a plurality of adjustably positionable valve members and an operatively disposed, in relatively inaccessible location, in the fuel line of the automobile or the like. Said valve members are arranged so that fuel flow through said fuel line will be permitted only when each of the former is disposed in a predetermined position thereof. Valve member positioning means are provided and are arranged to be disposed in a readily accessible location as, for example, beneath the automobile dashboard, and are operable through the use of included valve member position indicating means to enable the positioning of said valve members in said predetermined positions. Latching means which are operatively associated with the automobile ignition are provided and are automatically operable to position said valve members to prevent fuel flow when the ignition is turned off. Second multi-element valve means are provided and control fuel flow from an included, limited capacity fuel tank to enable limited movement of the automobile as in a parking lot or the like.

DESCRIPTION OF THE DRAWINGS

The above and other objects and significant advantages of this invention are believed made clear by the following detailed description thereof taken in conjunction with the accompanying drawings wherein:

FIG. 4 is a longitudinal cross sectional view taken through the valve body of the apparatus of the invention;

FIG. 7 is a front elevational view of a modified form of valve means for use with the apparatus of the invention; and FIG. 8 is a cross sectional view taken along line 8—8 in FIG. 7 with parts cut away for purposes of illustration.

DETAILED DESCRIPTION OF THE INVENTION

Figure 1:
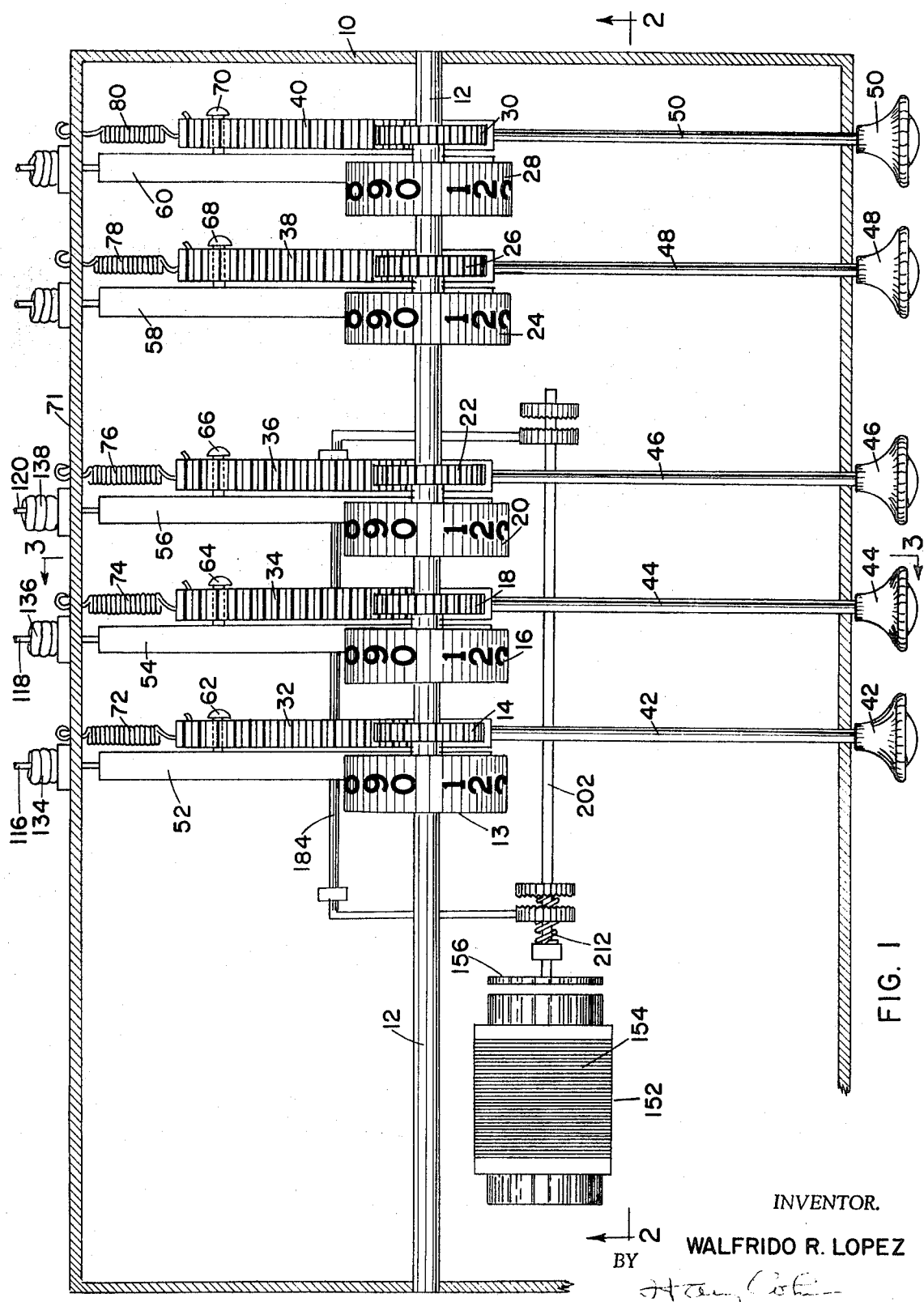
FIG. 1 is a top elevational view of the apparatus of the invention with parts cut away and parts in cross section.

Referring now to the drawings, a housing is indicated at 10 and comprises a shaft 12 extending thereacross. Indicating dial and pinion sets as indicated at 13 and 14, 16 and 18, 20 and 22, 24 and 26, and 28 and 30 are mounted for rotation as units on the shaft 12; while racks as indicated at 32, 34, 36, 38 and 40 are respectively operatively associated with said pinions in conventional manner, and are respectively slidably disposed as shown within the housing 10 from pull rod and actuating knob assemblies as indicated at 42, 44, 46, 48 and 50. Visual observation of the face of each of said indicating dials is made possible as illustrated in FIG. 3 for indicating dial 16 by the provision of a slidable dial cover assembly as shown at 51 which may be slidably moved to the depicted position thereof to enable observation of said dial face, and then closed in obvious manner to render such observation impossible.

Figure 3:
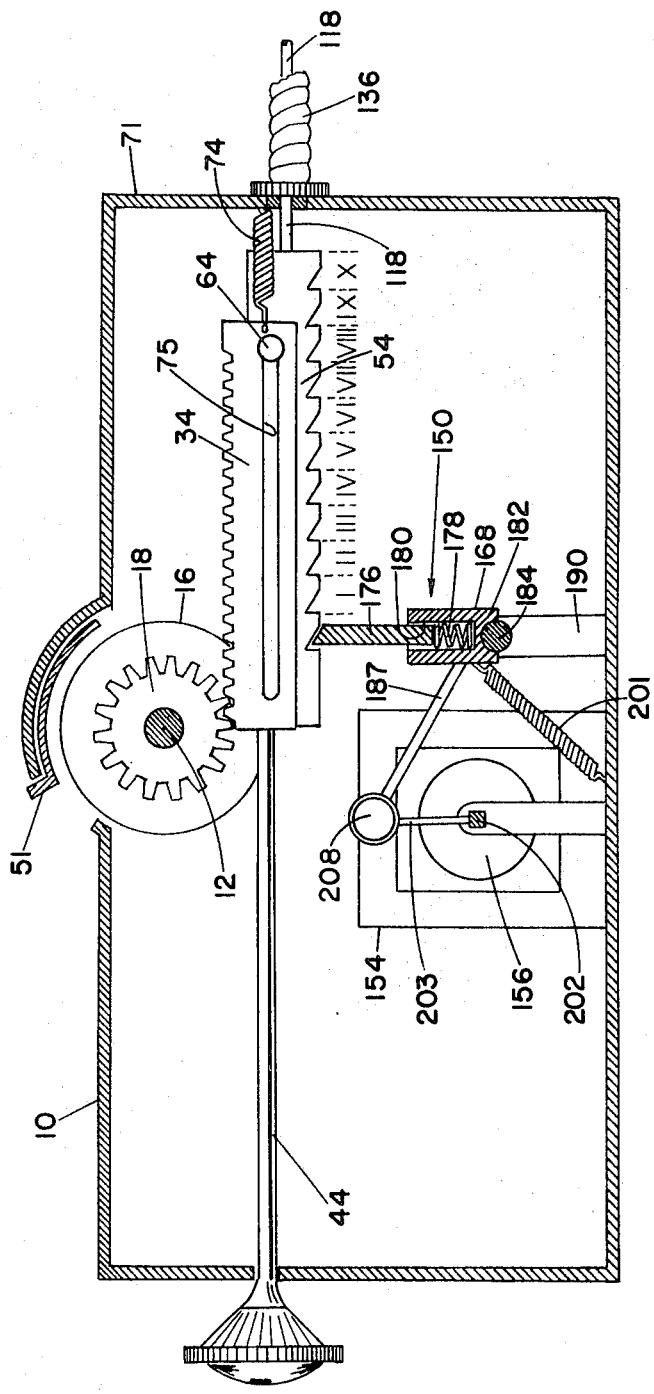
FIG. 3 is a cross sectional view taken along lines 3—3 in FIG. 1.
Figure 6:
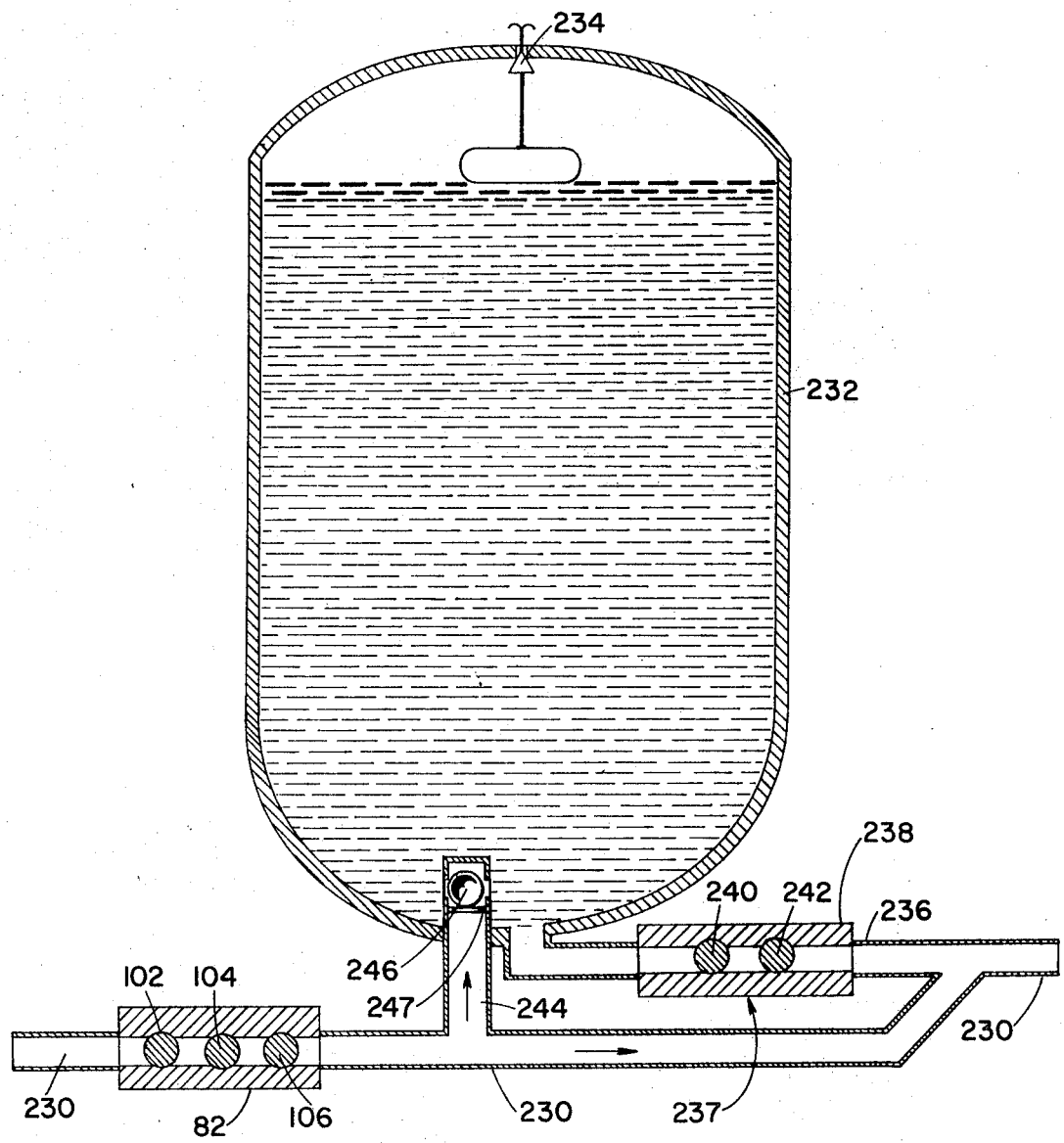
FIG. 6 is a longitudinal cross sectional view taken through the fluid supply means which are controlled by the apparatus of the invention.

Valve actuating ratchets as indicated at 52, 54, 56, 58 and 60 are respectively connected as shown to said racks by pin connectors 62, 64, 66, 68 and 70 which respectively extend as shown through elongated slots 73, 75, 77, 79 and 81 formed in said racks, whereby is provided that said valve actuating ratchets will be slidably movable with said racks in the direction from right to left as seen in FIG. 3, and that said racks will be movable independently of said valve actuating ratchets in the direction from right to left as seen in said FIG. The respective racks 32, 34, 36, 38 and 40 are biased as shown toward the right or rear end wall 71 of the housing 10 in FIG. 3 by biasing springs 72, 74, 76, 78 and 80.

A valve body is indicated at 82 in FIG. 4 and comprises stepped, generally cylindrical valve bores 84, 86 and 88 formed therein. Valve sleeves 90, 92 and 94 and 0-ring seals 96, 98 and 100 are respectively disposed as shown in said stepped valve bores, and generally cylindrical valve members 102, 104 and 106 are slidably disposed as illustrated in said stepped valve bores and sleeves. A fluid passage 108 is formed in said valve body to extend as shown through and generally transversely of said valve bores, and each of the valve members 102, 104 and 106 includes a similarly sized and configured valve port as indicated respectively at 109, 110 and 112 formed therein as shown to extend generally transversely thereof. A vacuum relief passage 114 extends as shown from the downstream side of fluid passage 108 to the respective lower extremities of the valve bores 84, 86 and 88 for purposes described in detail hereinbelow.

Valve actuating cables 116, 118 and 120 are respectively connected as shown by guide pin connectors 122, 124 and 126 to the valve members 102, 104 and 106 and extend therefrom as shown through end cap assemblies 128, 130 and 132 to without the valve body 82.

Figure 5:
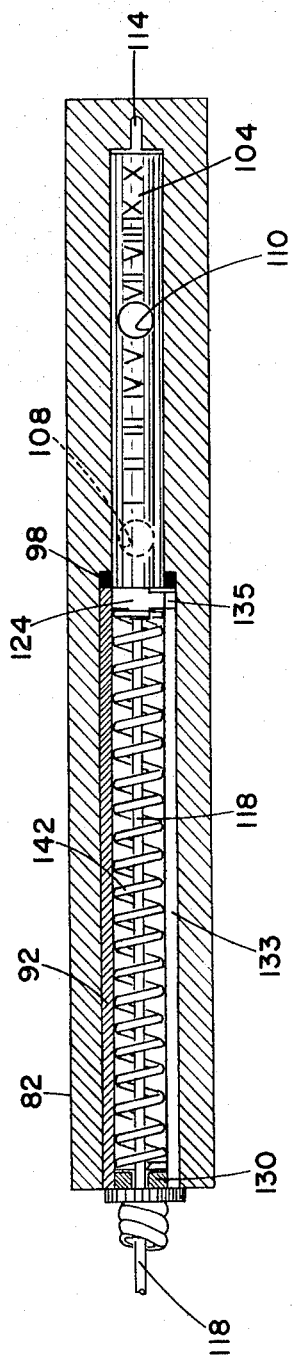
FIG. 5 is a cross sectional view taken along lines 5—5 in FIG. 4.

As seen for valve bore 86 in FIGS. 5, the sleeve 92 includes a guide groove 133 formed therein to extend generally longitudinally thereof, and the guide pin connector 124 includes a projection 135 which extends into said groove for movement longitudinally thereof to prevent rotation of the valve member 104 as should be obvious.

Protective sheaths as indicated at 134, 136 and 138 are provided as indicated to protect said valve actuating cables in conventional manner. Biasing springs 140, 142 and 144 are disposed as shown in said valve bores to bias said valve members toward the bottom of said valve body as seen in FIG. 4. Fluid supply tubes 146 and 148 extend as shown into and from fluid flow communication with the respective inlet and outlet of the fluid passage 108.

The respective valve actuating cables 116, 118 and 120 extend as shown from the valve body 82 through the rear end wall 71 of the housing 10 into operative connection with the respective rear extremities of the valve actuating ratchets 52, 54 and 56, whereby is believed made clear that desired movement of the respective valve members 102, 104 and 106—to align the respective valve member ports 109, 110 and 112 with the fluid passage 108 and enable fluid flow therethrough—may readily be effected through appropriate operation of the respective pull rod and actuating knob assemblies 42, 44 and 46 as indicated by observation of the respective faces of the indicating dials 13, 16 and 20.

Figure 2:
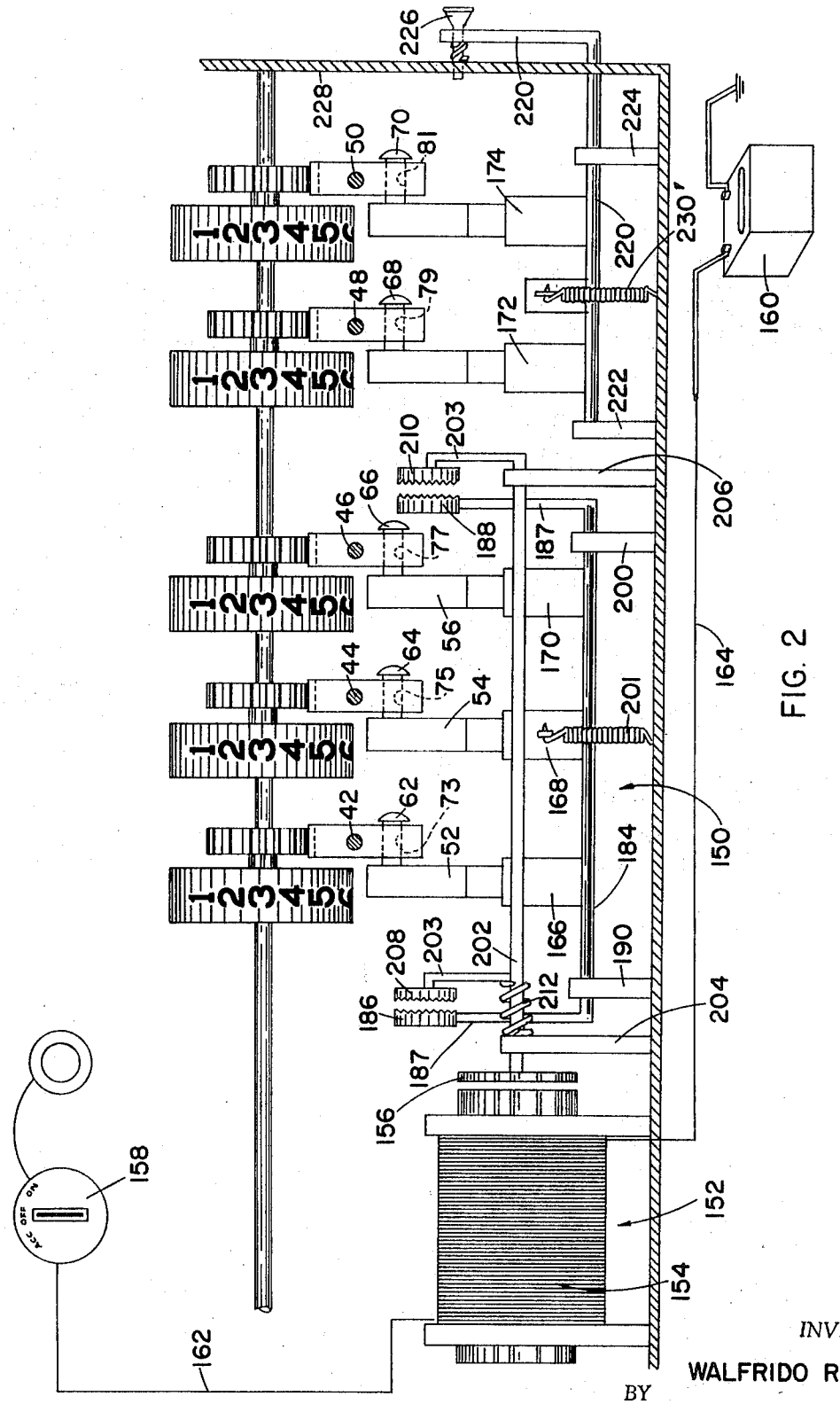
FIG. 2 is a cross sectional view taken along lines 2—2 in FIG. 1.

Latching means for securing the respective valve actuating ratchets 52, 54 and 56 in the desired positions thereof are indicated generally at 150 in FIGS. 1, 2 and 3 and may be understood to be operable, when energized, to maintain said valve actuating ratchets and valve members in the positions to which the same have been set by the respective pull rod and actuating assemblies 42, 44 and 46. More specifically, said latching means are operated from a solenoid 152, which comprises a coil 154 and armature 156, and is in turn arranged to be energized as shown from an ignition switch 158 and battery 160 as indicated by lines 162 and 164.

Further included in the latching means 150 are latch means 166, 168, 170, 172 and 174 which are respectively cooperatively associated as shown with the valve member actuating ratchets 52, 54, 56, 58 and 60. Each of the latch means takes the form of that shown in FIG. 3 for latch means 168 in comprising a latch member 176 which is spring biased by compression spring 178 for slidable movement as shown in a bore 180 of a latch member support element 182.

The latch means 166, 168 and 170 are supported from a generally U-shaped shaft 184 which includes clutches 187 and 188 disposed as shown at opposite extremities thereof, and the shaft 184 is in turn supported as shown for pivotal movement from the housing 10 by support posts 190 and 200. A tension spring 201 biases the shaft 184 and the latch means 166, 168 and 170 for pivotal movement in the counterclockwise direction as seen in FIG. 3.

The armature 156 of solenoid 152 is carried as shown from the extremity of a shaft 202 which is in turn supported for longitudinal movement from the housing 10 by support posts 204 and 206, and includes clutches 208 and 210 carried therefrom as shown. A compression spring 212 is operatively associated as shown with clutches 208 and 210 to bias the same, and the armature 156 away from the coil 154, said spring being disposed around rod 202 which carries clutches 208 and 210 on posts 203 mounted on said rod. Conversely, with the coil 154 energized from battery 160 through switch 158, it may be understood that armature 156 will be drawn toward the same in the direction from right to left as seen in FIG. 2 to engage the said clutches.

The latch means 172 and 174 are supported, in the manner of latch means 168, from an L-shaped shaft 220 which is in turn supported for pivotal movement from housing 10 by support posts 222 and 224. A spring loaded locating pin assembly 226 is carried from the extremity of shaft 220 and cooperates as best seen in FIG. 2 with a detent formed in the housing wall 228 to positively locate the shaft 220 and the latch means 172 and 174. A tension spring 230' biases the shaft 220 and latch means 172 and 174 in the manner of tension spring 201 as described hereinabove.

Each of the valve actuating ratchets 52, 54, 56, 58 and 60 includes 10 notches formed in the underside thereof as illustrated at I to X for ratchet 54 in FIG. 3 for cooperative action with the respective latch means 166, 168, 170, 172 and 174 in obvious manner, and it may be understood that each of said notches is effective, in cooperation with the relevant latch means, to position the related valve member in a different one of 10 positions thereof as indicated at I through X on valve member 104 in FIG. 5.

Referring now to FIG. 5, the valve body 82 of FIG. 4 is positioned in the fuel line 230 between the non-illustrated main fuel supply tank and the fuel pump. An auxiliary fuel tank of relatively limited capacity is indicated at 232 and includes vent means 234.

An auxiliary fuel line 236 connects tank 232 with fuel line 230, and valve means 237, which take the form of those depicted in FIG. 4 and include a valve body 238 and valve members 240 and 242, are interposed as shown in said auxiliary fuel line. The positions of the valve members 240 and 242 are controlled from the respective valve actuating ratchets 58 and 60. A fuel supply conduit 244, including a normally closed ball check valve 246, on valve seat 247 connects fuel line 230 with the auxiliary fuel tank 232 to provide for the automatic filling of the latter upon the flow of fuel through said fuel line.

In use, as when parking the automobile, the turning off of the ignition will release the latch means 166, 168 and 170 through clutch disengagement to enable the movement of the respective valve members 102, 104 and 106 to the bottom positions thereof in valve body 82 under the influence of compression springs 140, 142 and 144 and prevent further flow through the fuel line 230 as seen in FIG. 5 to thus positively prevent further operation of the automobile engine as should be obvious. The valve means 237 may then be opened, however, by the use of pull rod assemblies 48 and 50 and concomitant observation of the indicating dials 24 and 28 to place the valve members 240 and 242 in the known positions thereof wherein the valve member ports will be in alignment with the auxiliary fuel line 236 to permit fuel flow therethrough from auxiliary fuel tank 232, and the subsequent placement of the locating pin assembly 226 in the detent in housing wall 228 (FIG. 2) to latch the said valve members in the said positions. Accordingly, sufficient fuel will be provided, if needed, for limited movement of the automobile as in a parking lot.

When the automobile is to be re-started, however, it may be understood that the turning on of the ignition switch 158 will be effective to engage the respective latch means clutches and activate the latch means 166, 168 and 170 whereupon the respective valve members 102, 104 and 106 may be positioned—through use of pull rod assemblies 42, 44 and 46, and concomitant observation of indicating dials 13, 16 and 20 until the latter indicate that the said valve members are in the respective numbered positions thereof which are known only to the automobile operator to be effective to align the respective valve ports 109, 110 and 112—to enable fuel flow through the fuel line, whereupon the automobile engine may be re-started and operated in normal manner. At this time since there is no further need for the fuel in auxiliary fuel tank 232, the valve members 240 and 242 may be conveniently returned to the closed positions thereof to prevent further fuel flow through fuel bypass line 236 by the release of the locating pin assembly 226 to deactivate latch means 172 and 174.

A different form of valve means for use with the valve positioning means of FIGS. 1, 2 and 3 is depicted in FIGS. 7 and 8 and may be seen to comprise a rotary valve housing 250 having a rotary valve member 252 disposed therein for rotation by valve shaft 254. A pinion 256 is secured to the extremity of this valve shaft and is drivingly rotated in conventional manner from a slidable rack 258 which is in turn moved relative thereto by the valve actuating cable as here indicated at 260. A compression spring 262 biases the rack 258 to the right as seen in FIG. 8. A valve port 264 extends as shown through the rotary valve member 252 and is, of course, alignable with the fuel supply conduits 146 and 148 only in one predetermined position thereof for overall operation of this rotary valve means in the same manner described hereinabove for the slidable valve means of FIG. 4.

For use in an automobile or the like, it may be understood that the valve means are disposed in generally inaccessible manner on the underside of the automobile in the fuel line intermediate the main fuel supply tank and the fuel pump, to thereby render operation of the automobile engine impossible except as enabled by the capacity of the auxiliary fuel tank of FIG. 5. The valve moving and position indicating and latching means of FIGS. 1, 2 and 3 are, of course, most conveniently disposed on or beneath the automobile dashboard in readily and conveniently accessible manner. The valve moving means 42–50 being thus disposed within the interior of the vehicle in the vicinity of the driver's seat enables the driver to control the fuel flow to the engine while he is in the vehicle and obviates the necessity to open the engine hood in order to operate the valves in the fuel flow path.

Although disclosed as comprising only one valve body 82, it is believed clear that the valve means of FIG. 4 may alternatively comprise two or three valve housing which respectively contain one or more of the valve members 102, 104 and 106 and are disposed at different locations in the fuel line to thus render even more difficult any attempt to bypass the anti-theft device of the invention as should be obvious.

An additionally significant advantage of the anti-theft device of the invention resides in the fact that, since the turning off of the automobile ignition functions to positively discontinue the flow of fuel to the engine as discussed, a most desirable anti-theft safety feature which may, for example, be of importance following a relatively serious accident, is inherently provided thereby.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In a anti-theft device for automobiles or the like which include a fuel flow path, the improvements comprising, valve means in said fuel flow path for controlling the flow of fuel therethrough, said valve means comprising a plurality of valve members each of which is movable through a plurality of positions, said valve members being arranged so that fuel flow will be permitted through said fuel flow path only when the same are respectively in predetermined positions thereof, and means to move said valve members to said respective predetermined positions thereof, said valve member moving means comprising valve member position indicating means to indicate the respective positions of said valve members, said valve member moving means comprising valve member latching means which are effective to maintain said valve members releasably in said respective predetermined positions thereof, said valve means including biasing means for moving said valve members to positions thereof other than said predetermined positions upon the release of said latching means to thus prevent fuel flow through said fuel flow path upon such release.

2. In an anti-theft device as in claim 1 wherein said automobile or the like comprises an ignition circuit, and said device comprises means operatively connecting said ignition circuit and said valve member latching means in such manner that the latter will be automatically released upon the de-energization of said ignition circuit, and will be automatically engaged upon the energization of said ignition circuit.

3. In an anti-theft device as in claim 2 wherein, each of said valve members comprises a valve port extending therethrough and is slidable to said predetermined position thereof to align all of said valve ports with said fuel flow conduit to enable fuel flow through the latter.

4. In an anti-theft device as in claim 3 further comprising an auxiliary fuel supply of relatively limited capacity, a second fuel flow path connecting said auxiliary fuel supply to said fuel flow path downstream of said valve means, second valve means in said second fuel flow path between said auxiliary fuel supply and said fuel flow path for controlling the flow of fuel therethrough, said second valve means comprising a plurality of valve members each of which is movable through a plurality of positions, said valve members being arranged so that fuel flow will be permitted through said second fuel flow path only when the same are respectively in predetermined positions thereof, means to move said valve members of said second valve means to said respective predetermined positions thereof, said valve member moving means comprising indicating means for indicating the positions of said valve members of said second valve means, and means for latching said valve members of said second valve means in said respective predetermined positions thereof.

5. In an anti-theft device as in claim 2 wherein, each of said valve members comprises a valve port extending therethrough and is rotatable to said predetermined position thereof to align all of said valve ports with said fuel flow path and enable fuel flow through the latter.

6. In an anti-theft device as in claim 5 further comprising an auxiliary fuel supply of relatively limited capacity, a second fuel flow path connecting said auxiliary fuel supply to said fuel flow path down stream of said valve means, second valve means in said second fuel flow path between said auxiliary fuel supply and said fuel flow path for controlling the flow of fuel therethrough, said second valve means comprising a plurality of valve members each of which is movable through a plurality of positions, said valve members being arranged so that fuel flow will be permitted through said second fuel flow path only when the same are respectively in predetermined positions thereof, means to move said valve members of said second valve means to said respective predetermined positions thereof, said valve member moving means comprising indicating means for indicating the positions of said valve members of said second valve means, and means for latching said valve members of said second valve means in said respective predetermined positions thereof.

7. In a anti-theft device for automobiles or the like which include a fuel flow path, the improvements comprising, valve means in said fuel flow path for controlling the flow of fuel therethrough, said valve means comprising a plurality of valve members each of which is movable through a plurality of positions, said valve members being arranged so that fuel flow will be permitted through said fuel flow path only when the same are respectively in predetermined positions thereof, and means to move said valve members to said respective predetermined positions thereof, said device further comprising an auxiliary fuel supply of relatively limited capacity, a second fuel flow path connecting said auxiliary fuel supply to said fuel flow path downstream of said valve means, second valve means in said second fuel flow path between said auxiliary fuel supply and said fuel flow path for controlling the flow of fuel therethrough, said second valve means comprising a plurality of valve members each of which is movable through a plurality of positions, said valve members being arranged so that fuel flow will be permitted through said second fuel flow path only when the same are respectively in predetermined positions thereof, means to move said valve members of said second valve means to said respective predetermined positions thereof, said valve member moving means comprising indicating means for indicating the positions of said valve members of said second valve means, and means for latching said valve members of said second valve means in said respective predetermined positions thereof.

8. In a anti-theft device for automobiles or the like which include a fuel flow path, the improvements comprising, valve means in said fuel flow path for controlling the flow of fuel therethrough, said valve means comprising a plurality of valve members each of which is movable through a plurality of positions, said valve members being arranged so that fuel flow will be permitted through said fuel flow path only when the same are respectively in predetermined positions thereof, and means to move said valve members to said respective predetermined positions thereof, said valve moving means being disposed within the interior of the vehicle in the vicinity of the driver's seat, said automobile or the like comprising an ignition circuit, and said device comprising means operable in response to the making and breaking of said ignition circuit for controlling the operability of said valve moving means.